United States Patent
Koch et al.

(10) Patent No.: US 6,786,711 B2
(45) Date of Patent: Sep. 7, 2004

(54) METHOD AND SYSTEM FOR PRODUCTION OF FIBROUS COMPOSITE PROTOTYPES USING ACOUSTIC MANIPULATION IN STEREOLITHOGRAPHY

(75) Inventors: Robert M. Koch, South Kingstown, RI (US); Robert Kuklinski, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 416 days.

(21) Appl. No.: 09/876,372

(22) Filed: Jun. 8, 2001

(65) Prior Publication Data

US 2002/0185782 A1 Dec. 12, 2002

(51) Int. Cl.$^7$ .............................................. B29C 13/08
(52) U.S. Cl. .................................... 425/174.2; 425/174
(58) Field of Search ............................ 425/174, 174.2, 425/174.4

(56) References Cited

U.S. PATENT DOCUMENTS

| | | | | |
|---|---|---|---|---|
| 5,525,051 A | * | 6/1996 | Takano | 425/174.4 |
| 5,688,464 A | * | 11/1997 | Jacobs et al. | 264/401 |
| 5,840,241 A | * | 11/1998 | Bishop et al. | 264/437 |
| 5,904,889 A | * | 5/1999 | Serbin et al. | 264/401 |
| 5,945,058 A | * | 8/1999 | Manners et al. | 264/401 |
| 6,003,832 A | * | 12/1999 | Ueno et al. | 249/135 |

\* cited by examiner

Primary Examiner—Joseph Drodge
Assistant Examiner—Emmanuel Luk
(74) Attorney, Agent, or Firm—James M. Kasischke; Michael F. Oglo; Jean-Paul A. Nasser

(57) ABSTRACT

A method for producing a three-dimensional object by stereolithography. A solid reinforcing material is mixed with the fluid medium so that at least a part of said solid reinforcing medium is located in the layer of the fluid medium between the top surface of the most recently formed lamina and the top surface of the fluid medium. An acoustic field is then established in the fluid medium such that this acoustic field exists in at least part of the layer of the fluid medium between the top surface of the most recently formed lamina and the top surface of the fluid medium. The solid reinforcing material is thereby moved with said acoustic force field. A three-dimensional reinforced object is thereby produced.

5 Claims, 2 Drawing Sheets

ND SYSTEM FOR PRODUCTION
METHOD AND SYSTEM FOR PRODUCTION OF FIBROUS COMPOSITE PROTOTYPES USING ACOUSTIC MANIPULATION IN STEREOLITHOGRAPHY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to stereolithography methods and systems involving the application of lithographic techniques to three-dimensional objects, and more particularly to providing structural reinforcement of such three-dimensional objects.

(2) Brief Description of the Prior Art

Stereolithography is a "printing" process invented by Charles Hull in 1986 by which three-dimensional copies of solid models are fabricated in plastic. This process is disclosed in U.S. Pat. No. 4,575,330 to Hull, the contents of which are incorporated herein by reference. The Hull patent discloses a system for generating three-dimensional objects by creating a cross sectional pattern of the object to be formed at a selected surface of a fluid medium. This fluid medium is capable of altering its physical state in response to appropriate synergistic stimulation by impinging radiation, particle bombardment or chemical reaction. Successive adjacent laminae, representing corresponding successive adjacent cross sections of the object, are automatically formed and integrated together to provide a step-wise laminar buildup of the desired object. A three-dimensional object is thereby formed and drawn from a substantially planar surface of the fluid medium during the forming process. This process was the first solid imaging process that allowed the fabrication of highly complex physical parts directly from computer generated topology data as is disclosed by Jacobs in *Rapid Prototyping and Manufacturing: Fundamentals of StereoLithography* (1992).

In fact, the advantages of stereolithography prototyping over traditional machining become even more prominent with increasing part complexity. For example, parts involving intricate internal cavities or encased subparts that are impossible to machine as one part are easily fabricated with stereolithography. Physical application of the stereolithography printing process for rapid prototyping takes place via a commercial system known as a stereolithography apparatus (SLA), manufactured by 3D Systems, Inc., Valencia, Calif., which is shown in FIG. 1.

Referring to FIG. 1, a liquid photopolymer 10 in a vat 12 is positioned beneath a moveable HeCd laser 14. The SLA part 16 is positioned on an elevator 18. The upper surface 20 of the SLA part 16 is positioned just below the top surface 22 of the liquid photopolymer 10 so that successive layers can be added to the SLA part 16.

To produce a physical part, the SLA receives solid or surface model geometry data via a specifically formatted input data file known as an STL file. The STL file contains a topological representation of the part in terms of many small triangular flat-faced facets whose dimensions and orientation in space are precisely defined. The STL file "virtual" part is then mathematically "sliced" by computer software into very thin horizontal cross sections or layers. The lowest cross section data is sent to a computer-controlled optical scanning system controlling the helium cadmium (HeCd) laser 14. The laser 14 draws out the shape of the cross section down onto the surface of the vat 12 of photosensitive liquid resin. Ultraviolet radiation solidifies the resin surface wherever the laser strikes, thereby precisely transforming the cross section into a thin solid layer. The process repeats itself, layer by layer, with each polymerized layer adhering to the layer below it, until a final three-dimensional physical part is produced; this layer-wise assembly is accomplished on elevator platform 18 within the vat 12 which is lowered incrementally with the creation of each new layer. Finally, the full part is removed from the liquid vat and exposed to high intensity ultraviolet light to fully cure it and complete the polymerization process.

The SLA process was originally intended to produce prototypes for conceptual and 3D visualization purposes only. However, users of stereolithography quickly began to desire to actually test the prototypes in the laboratory. Since the first generation stereolithography polymer resins were typically brittle, low-strength, and prone to warping, second generation epoxy-based photopolymers were developed with improved mechanical properties and dimensional stability. One of these is disclosed in U.S. Pat. No. 5,437,964 to Lapin et al. However, except for very carefully designed experiments as is reported, for example, by W. H. Dornfeld, (1994), "Direct Dynamic Testing of Scaled Stereolithographic Models" *International Gas Turbine and Aeroengine Congress and Exposition*, The Hague, Netherlands (ASME Prepromt 94-GT-271), the improved polymers to date still have not achieved the mechanical strength necessary for general laboratory testing loads (e.g., high-speed in-water testing for marine applications, high-speed centrifugal loading, etc.).

Other prior art related to stereolithography and mixing materials into the fluid medium used in that process are summarized as follows.

U.S. Pat. No. 5,248,456 to Evans, Jr. et al. discloses an improved stereolithographic apparatus and method. In one embodiment, the improvement includes immersing at least a portion of a part in a volume of a liquid solvent in a vapor degreaser while subjecting the portion to ultrasonic agitation to substantially remove excess resin. Several examples of solvents are provided, including ethanol, and FREON™. In a second embodiment, the improvement includes building the part on a layer of liquid resin supported by a volume of a dense, immiscible and UV transparent intermediate liquid, and integratably immersing at least a portion of the built part in the intermediate liquid, and then either subjecting the immersed portion to ultrasonic agitation to substantially remove excess resin, or subjecting the immersed portion to UV light. Several examples of intermediate liquids are provided, including prefluorinated fluids, such as FLUORI-NER™ FC-40 and water-based salt solution, such as solution of magnesium sulfate or sodium chloride in water.

U.S. Pat. No. 5,296,335 to Thomas et al. discloses a method of manufacturing a three-dimensional fiber-reinforced part utilizing the single-tool method of stereolithography. The tool is fabricated by designing the tool on a computer-aided design system and curing successive layers of a fluid medium via a computer-controlled irradiation source to form the three-dimensional tool. The desired part is generated by applying layers of resin-wetted fabric to the tool, curing the fabric on the tool, removing the tool from the designed part, and cleaning, trimming and inspecting the designed part.

U.S. Pat. No. 5,688,464 to Jacobs et al. discloses a method and apparatus for providing a vibrational enhancement to the recoating process in stereolithography. The formation of a thin layer of building material over a previous layer of structure of a partially completed three-dimensional object, in preparation for formation of an additional layer of structure is enhanced by the use of vibrational energy imparted to the building medium. In a first preferred apparatus, vibration is induced into the surface of the material by a plurality of vibrating needles that penetrate below the working surface to a sufficient depth to ensure adequate coupling but not deep enough to come into contact with the surface of the partially completed part. In a second preferred apparatus, vibration is coupled directly to the object support. The vibrational energy is then transmitted through the part to the surface of the building material. In a first preferred method, the partially completed object is overcoated with material and vibration is used to reduce the coating thickness. In a second preferred method, the partially completed object is undercoated with material and vibration is used to increase the coating thickness.

U.S. Pat. No. 5,731,388 to Suzuki et al. discloses photocurable resins containing unsaturated urethane of a specified form and vinyl monomer which is N-(meth) acryloylmorpholine or its mixture with di-ol di(meth) acrylate at a rate within a specified range and compositions containing such a resin and a filler such as solid particles and/or inorganic whiskers of specified kinds at a specified rate are capable of yielding stereolithographed objects with improved mechanical and thermal properties and form precision.

U.S. Pat. No. 6,003,832 to Ueno et al. discloses a mold having a cavity for shaping a three-dimensional object, which comprises a photocured resin composition including a liquid photocurable resin and at least one reinforcing agent selected form the group consisting of inorganic solid particles having an average particle diameter of 3 to 70 μm and a whisker having an average diameter of 0.3 to 1.0 μm, a length of 10 to 70 μm and an aspect ratio of 10 to 100 and optionally, in which the inner surface of the cavity is covered by a solid film having a thickness of 5 to 1000 μm.

Unlike the common method of using the SLA prototype as "wax" masters for investment casting of metal parts as described in U.S. Pat. No. 4,844,144 to Murphy et al., there have been attempts at strengthening the actual SLA prototype itself to allow its direct use in testing. The simplest, yet most limited, method is to perform post-stereolithography milling and drilling operations to allow the insertion of strengthening agents such as rods, plates, etc. Another option is to modify the SLA operation in such a way as to allow the insertion of non-polymer components (e.g., metal, ceramic) directly during the SLA process such as in the invention describe in U.S. Pat. No. 5,705,177 to Roufa et al. Another option is the deposition of various metalized coatings to the SLA prototype to both strengthen and protect it for laboratory testing purposes. Finally, U.S. Pat. No. 5,296,335 to Thomas et al. patented a method that utilizes stereolithography parts to create a tool and the application of resin-wetted fabric on the tool to create fiber-reinforced parts. This patent envisions the removal of the stereolithographic tool but clearly one may leave it inside if necessary for support purposes during testing.

While the invention of the newer more capable SLA photopolymers discussed above has been helpful in allowing carefully designed testing of SLA prototypes to occur, in general the progress has been slow and limited. Utilizing even the most advanced photopolymer in commercial use today still puts rather severe limitations on available laboratory testing of SLA prototypes.

The insertion of metal or ceramic structural support members via drilling and milling operations is only practical for the simplest of geometries. In a more complex SLA prototype, it may not even be possible to utilize this method due to part size, required internal voids in the part, part slenderness, drastic curves or severe changes in angular direction, or inability to support the part in a specific required direction.

Of the methods currently in use for structural strengthening of SLA prototypes for testing, the incorporation of external coatings discussed offers the best chance for success. However, even this method is limited to some degree to fairly simple geometries. For example, it is impossible to strengthen internal supports with this method. Clearly, this method is not complementary to the very strength of the stereolithography process-namely, the power to generate intricate, highly complex geometries with multiple internal cavities.

It has been well known for many years that the radiation pressure of acoustic waves may be used to control or manipulate intermittancies e.g., bubbles, particles, etc. in a fluid medium (see for example, Hanson, A. R., E. G. Domich and H. s. Adams, (1964), "Acoustic Liquid Drop Holder", Rev. Sci. Instrum.,Vol 35, pp. 1031–1034). In fact, this method can easily be used to cause fluid motion itself. More recently, arrays of modern acoustic transducers have been employed in more advanced ways to move and segregate particles.

U.S. Pat. No. 4,743,361 to Schram discloses a method for separating particle types from a mixed population of particles in a liquid. This separation is obtained using an ultrasonic wave produced by interference between the outputs from spaced ultrasonic sources. One or more selected particle types may be separated by displacement axially along the standing wave or transversely through the standing wave or through combination of both methods. The described separation can be achieved by control of flow of the liquid or giving the standing wave a drift, or by controlling the intensity or the frequency of the standing wave or by any combination of these factors.

U.S. Pat. No. 4,983,189 to Peterson et al. discloses a method and apparatus for controlling the movement of materials having different physical properties when one of the materials is a fluid. The invention does not rely on flocculation, sedimentation, centrifugation, the buoyancy of the materials, or any other gravity dependent characteristic, in order to achieve its desired results. The methods of the Peterson et al invention provide that a first acoustic wave is propagated through a vessel containing the materials. A second acoustic wave, at a frequency different than the first acoustic wave, is also propagated through the vessel so that the two acoustic waves are superimposed upon each other. The superimposition of the two waves creates a beat frequency wave.

U.S. Pat. No. 5,803,270 to Brodeur, discloses accurate ejection of liquid droplets and agitation of liquids. Oeftering, R. C., "Manipulation of Liquid by Use of Sound", NASA Tech Briefs, December, 1998, pp. 72–75, describes a very good example of a typical modern acoustic-radiation pressure phased array concept for performing such operations. The main benefit of all these acoustic manipulation inventions is their ability to exert control over a fluid medium and/or objects in the fluid medium without intruding into its container as shown in FIG. 2.

Referring to FIG. 2, a set of left and right phased array transducers 24 and 26 are employed to nonintrusively control and manipulate the position of a dissimilar object 28 in a fluid medium 30 using acoustic radiation pressure.

SUMMARY OF THE INVENTION

It is an object of the present invention to provide a means of structural strengthening of SLA prototypes.

It is another object of the invention to provide structural strengthening without interfering with the ability to form complex shapes.

It is yet another object of this invention to strengthen an object internally.

Those and other objects are accomplished by the present invention, which is a method for producing a three-dimensional object by first providing a fluid medium having a top surface and which is capable of solidification when subjected to a prescribed stimulation. A solid reinforcing material is then mixed with the fluid medium. Successive cross sectional laminae are then formed, wherein each has a top surface of said object at a two-dimensional interface. These cross sectional laminae are moved downwardly as they are formed, such that there is a layer of the fluid medium between the top surface of the most recently formed lamina and the top surface of the fluid medium. The object is built up in step wise fashion so that each lamina is formed from at least part of the layer of the fluid medium between the top surface of the most recently formed lamina and the top surface of the fluid. A solid reinforcing material is then mixed with the fluid medium so that at least a part of said solid reinforcing medium is located in the layer of the fluid medium between the top surface of the most recently formed lamina and the top surface of the fluid medium. An acoustic force field is then established in the fluid medium. The acoustic force field exists in at least part of the layer of the fluid medium between the top surface of the most recently formed lamina and the top surface of the fluid medium so that the solid reinforcing material is moved.

BRIEF DESCRIPTION OF THE DRAWINGS

Other objects, features and advantages of the present invention will become apparent upon reference to the following description of the preferred embodiments and to the drawing, wherein corresponding reference characters indicate corresponding parts in the drawing and wherein.

DESCRIPTION OF THE PREFERRED EMBODIMENT

Figure 1:
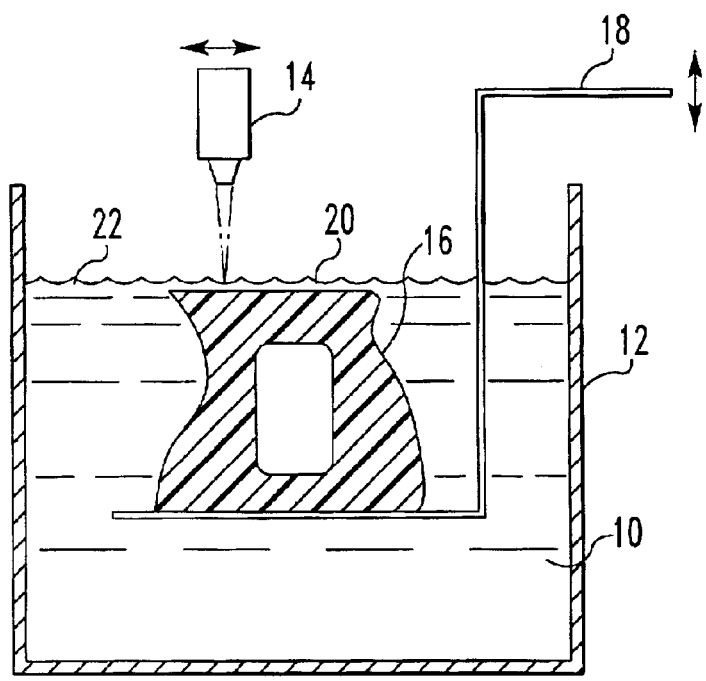
FIG. 1 is a schematic cross sectional view of a prior art stereolithography apparatus (SLA)
Figure 2:
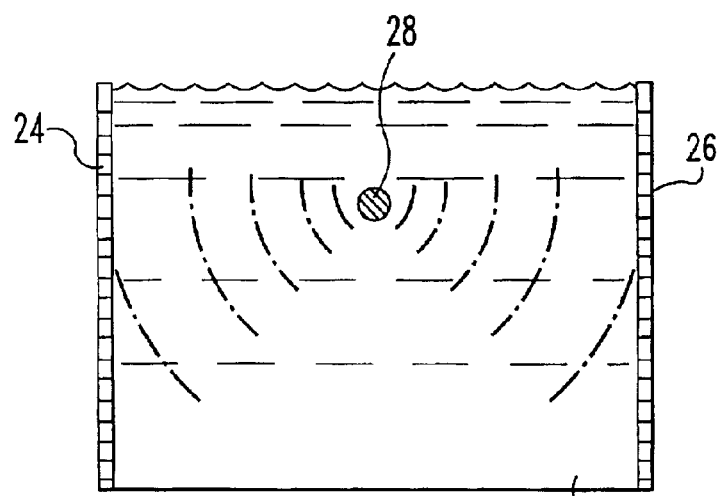
FIG. 2 is a schematic drawing of a prior art concept for manipulating particles in a fluid.
Figure 3:
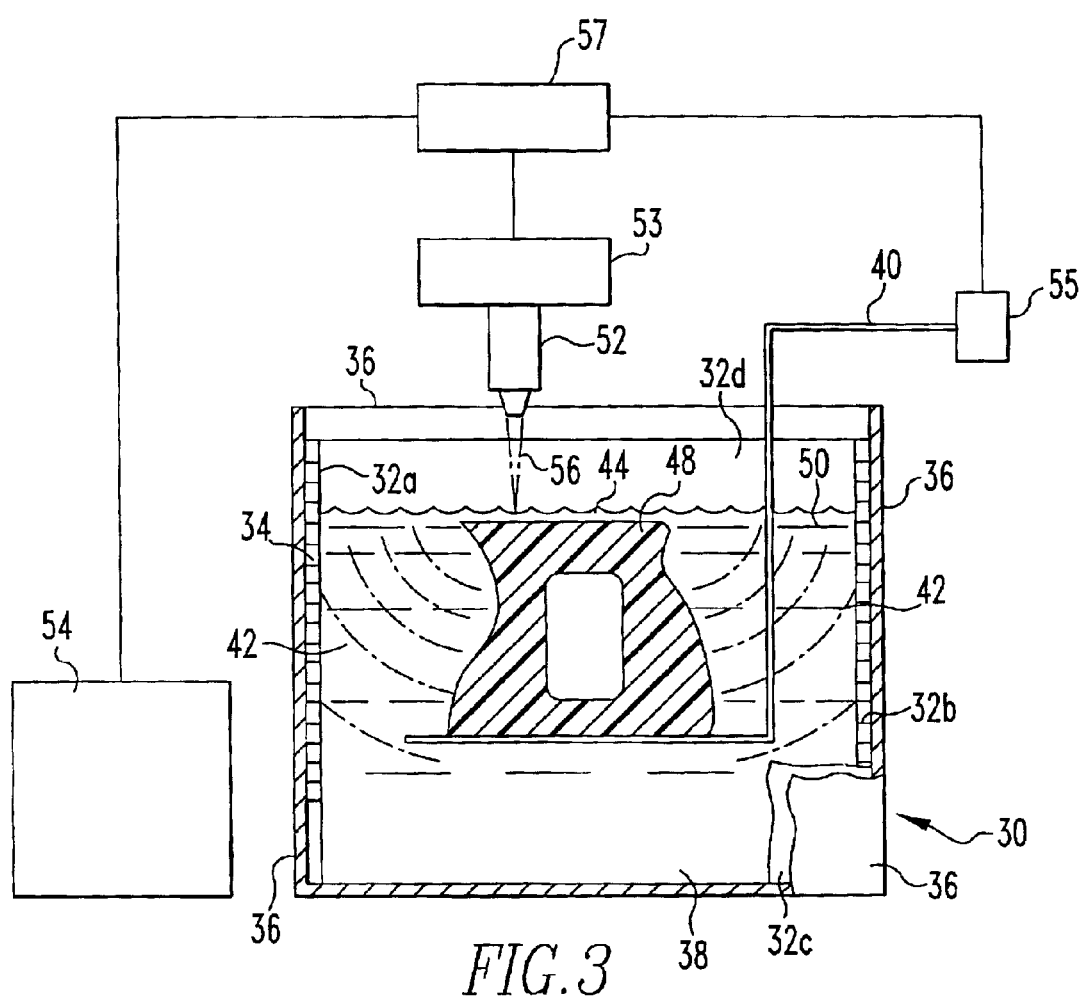
FIG. 3 is a cut away front elevational view of a system representing a preferred embodiment of the present invention.

FIG. 3 shows an elevational view of the present invention. A stereolithography apparatus (SLA) machine 30 similar to the SLA machine shown in FIG. 1, which has been outfitted with four distributed planar acoustic arrays as, for example, arrays 32a and 32b, which consist, for example, of many individually controlled piezoceramic acoustic transducer elements 34 on the interior of each of the vat's four vertical walls 36. Acoustic arrays 32a and 32b are on the opposed side vertical walls 36 of the vat while two other arrays 32c and 32d are on the opposed end vertical walls 36. The four arrays 32a 32b, 32c and 32d are designed and mounted within the liquid photopolymer bath 38 in such a way as to not disrupt the workings of the perforated elevator platform 40. Additionally, the acoustic arrays 32a, 32b, 32c and 32d are positioned and oriented so that superimposed acoustic waves 42 may be generated. These waves 42 overlap in the "thin" layer region 44 of liquid polymer 38 between the liquid surface 46 and the top portion of the solidified SLA part 48 for all vertical positions of the elevator platform 40. This relationship is maintained throughout the phases of fabrication. As discussed previously, the SLA machine 30 includes a laser 52 and an elevator 40. Laser 30 is joined to laser positional control equipment 53, and elevator 40 is joined to elevator control equipment 55. Laser positional control equipment 53 and elevator control equipment 55 are joined to an SLA machine controller 57. The current invention adds an acoustic controller 54 that is joined with SLA machine controller 57 for coordinating acoustic signals with the position of laser 52. Acoustic controller 54 is also attached to each acoustic array as, for example, 32a and 32b for providing acoustic signals to each transducer 34.

The acoustic arrays as, for example, arrays 32a and 32b are used to focus an acoustic beam 42 and thereby apply acoustic radiation pressures (and thus forces) to short whisker-like fibers 50 suspended within the SLA photopolymer bath 38. The superimposed acoustic waves allow manipulation and control of the positioning of the fibers 50 within the bath. Specifically, it is envisioned that these fibers 50 are directed and their position maintained in the thin layer region 44 of liquid photopolymer 38 above the solidified part 48 during the laser 52 sweep portion of each SLA layer cycle. Thus, the fibers 50 will automatically be entombed in the precise desired positions within the final solidified SLA part 48. The precise focusing and positioning of the fibers 50 is accomplished via appropriately altering the amplitude, phase and frequency of the individual transducer elements 34 in the acoustic arrays, as for example, array 32a and 32b using conventional acoustic beamforming practices and acoustic controller 54. In coordination with SLA machine controller 57, acoustic controller 54 can manipulate fibers and particles in many different ways to give desired characteristics. A single layer can be provided with a uniform particle size or fiber orientation. Differing fiber orientations allow cross-linked strengthening of the object. The point of solidification under the laser can also be provided with a selected particle size or orientation.

The phased acoustic array beamforming used herein allows concentration of the fibers 50 in regular bands on a horizontal plane in the thin liquid region 44. The spacing between these rows of high concentration of fibers is dependent on the instantaneous acoustic wavelength in the photopolymer bath and can easily be controlled by altering the acoustic transducer operating frequency. The wavelength $\lambda$ in an acoustic fluid is governed by the familiar relation $\lambda = c/f$, where c is the speed of sound in the fluid and f is the acoustic wave frequency. Stirring or adding of fibers is envisioned throughout the SLA prototyping process in order to keep their distribution constant.

It is also envisioned that the acoustic properties i.e., mass, density and acoustic wave speed, of the fibers should be chosen so as to be amenable to acoustic pressure manipulation while being mismatched with the solidified polymer properties to avoid strongly affecting the solid part during the SLA process. Furthermore, it is advantageous to choose the optical properties e.g., wavelength and power, of the laser beam 56 and the fibers 50 so that the path of the laser 56 is not greatly affected by the presence of the fibers 50. Finally, any resulting surface deformation caused by the acoustic beam or superimposed acoustic waves can be controlled and limited to workable levels via appropriate modification of the amplitudes and focusing of the transducers 34.

In addition to obvious gravitational limitations, the size of the objects, i.e., fiber length, used for the present invention is limited to some degree by the thickness of the liquid photopolymer layer 44 being exposed by the laser on any given sweep. It is possible to increase the available object size by simply increasing the specified layer thickness during the conventional SLA slicing process. This modification is especially appropriate for fabrication of parts with more simple geometries, where a loss in vertical resolution of the final SLA part is not overly critical.

The method and system of the present invention provides a means for fabricating whisker fiber-reinforced prototypes directly using stereolithography. The method and system of the present invention takes advantage of the nonintrusive nature of acoustic manipulation in a fluid medium to precisely control the distribution of fibers in a SLA photopolymer bath during SLA fabrication. For the first time, it is possible to control the orientation and positioning of fibers interactively during the entire stereolithography process, ensuring the optimal distribution and density of fibers throughout the final solidified part.

The result is a solidified fibrous composite SLA part with mechanical strength sufficient enough to allow actual laboratory testing. Additionally, in contrast to previously mentioned methods for SLA part strengthening, no post fabrication operations need be performed. Finally, the present invention requires no major modifications to conventional SLA systems and can conceivably be retrofitted to existing systems.

Versions of the present invention with particles replacing fibers may be constructed for the creation of particulate composite SLA prototypes.

The proven ability of phased acoustic array systems to segregate and control materials with different physical properties as is disclosed in U.S. Pat. No. 4,743,361 to Schram and U.S. Pat. No. 4,983,189 to Peterson et al. may be exploited to allow the use of both particles and fibers in the present invention for the creation of customized particulate/fibrous composite SLA prototypes. It is envisioned that the distribution of particles and fibers may be controlled during fabrication to create a solidified composite part with particles in certain desired locations and fibers in others. In fact, with sufficient signal processing and array geometries, it is even envisioned having a multiple particle sizes and multiple fiber sizes all incorporated into a single part solidification. A typical fiber that may be used in the method of this invention is KEVLAR™ which are commercially available from the Dupont Corporation with headquarters at Wilmington, Del. Typical particles that may be used in the method of this invention are glass microspheres, which are commercially available from the 3M Corporation with headquarters at St. Paul, Minn.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A system for producing an object comprising:
    a fluid medium having a surface, said fluid medium capable of transforming its physical state in response to a stimulation;
    a solid reinforcing material provided in said fluid medium;
    a support means immersed within said fluid medium, and progressively moveable away from said fluid medium surface;
    a translational means joined to said support means capable of moving said support means with respect to said fluid medium surface;
    a stimulation means capable of providing the stimulation altering the physical state of said fluid medium at said fluid medium surface;
    at least two acoustic transducer arrays having a plurality of transducer elements positioned in said fluid medium and capable of providing an acoustic field at said fluid medium surface for manipulating said reinforcing material; and
    an acoustic controller joined to said at least two acoustic transducer arrays to control the transducer elements and the acoustic field by beamforming acoustic radiation from the transducer elements.

2. The system of claim 1 further comprising an object controller joined to said translational means and said stimulation means, said object controller being capable of positioning said stimulation means and said translational means for controlling positioning of the stimulation means with respect to the support means.

3. A system for producing an object comprising:
    a fluid medium having a surface, said fluid medium capable of transforming its physical state in response to a stimulation;
    a solid reinforcing material provided in said fluid medium;
    a support means immersed within said fluid medium, and progressively moveable away from said fluid medium surface;
    a translational means joined to said support means capable of moving said support means with respect to said fluid medium surface;
    a stimulation means capable of providing the stimulation altering the physical state of said fluid medium at said fluid medium surface;
    at least two acoustic transducers positioned in said fluid medium and capable of providing an acoustic field at said fluid medium surface for manipulating said reinforcing material;
    an acoustic controller joined to said at least two acoustic transducers for controlling the provided acoustic field; and
    an object controller joined to said translational means and said stimulation means, said object controller being capable of positioning said stimulation means and said translational means for controlling positioning of the stimulation means with respect to the support means;
    wherein said object controller is joined to said acoustic controller for coordinating the position of the provided acoustic field with the portion of the fluid medium being subjected to said stimulation means.

4. The system of claim 3 further comprising a vat having a plurality of walls containing said fluid medium therein, said acoustic transducers being positioned on at least two of said walls.

5. The system of claim 1 wherein the solid reinforcing material is selected from a group consisting of a fibrous material, a nonfibrous material and a mixture of a fibrous material and a nonfibrous material.

* * * * *